United States Patent [19]
Austin et al.

[11] Patent Number: 6,049,145
[45] Date of Patent: Apr. 11, 2000

[54] TAMPER PROOF SAFETY CIRCUIT

[75] Inventors: Micheal M. Austin, Lilburn, Ga.;
Kevin D. Page, Plantation, Fla.

[73] Assignee: Motorola, Inc., Schaumburg, Ill.

[21] Appl. No.: 08/888,391

[22] Filed: Jul. 7, 1997

[51] Int. Cl.[7] .................................................. H02J 7/00
[52] U.S. Cl. ............................................ 307/150; 429/163
[58] Field of Search ..................................... 307/150, 119,
307/112, 116; 429/116, 7, 65, 163; 340/573;
379/38, 39; 200/61.18; 361/749, 777; 257/922

[56] References Cited

U.S. PATENT DOCUMENTS

| | | | |
|---|---|---|---|
| 5,255,306 | 10/1993 | Melton et al. | 379/38 |
| 5,387,126 | 2/1995 | Austin et al. | 439/516 |
| 5,541,578 | 7/1996 | Lussey | 340/571 |

*Primary Examiner*—Richard T. Elms
*Attorney, Agent, or Firm*—Felipe J. Farley; Philip H. Burrus, IV

[57] ABSTRACT

An electronic device (100) includes electrical circuitry (130), a housing (105) in which the electronic circuitry (130) is situated, a cover (110) for enclosing the electrical circuitry (130) within the housing (105), and a tamper proof safety circuit (120) coupled to the electrical circuitry (130) for rendering the electronic device (100) inoperable when the housing (105) and cover (110) are disassembled.

4 Claims, 3 Drawing Sheets

TAMPER PROOF SAFETY CIRCUIT

TECHNICAL FIELD

This invention relates in general to electronic devices, and more specifically to electronic devices that include safety circuits.

BACKGROUND OF THE INVENTION

Current market demands for small, lightweight electronic devices, such as cellular telephones, have required that batteries for such devices also become smaller and lighter in weight. As a result, many battery packaging designs have incorporated the use of extremely thin packaging in the form of covers, housings, and integral cover/labels that can be removed or peeled open without difficulty. Though the packaging of a battery is sometimes destroyed upon disassembly, the battery can still remain electrically functional with its active circuitry fully exposed. This represents a significant safety risk, especially when an opened battery contains lithium cells or high energy super capacitors.

Thus, what is needed is an improved tamper proof safety circuit for use in electronic devices such as batteries.

DETAILED DESCRIPTION OF THE PREFERRED EMBODIMENT

Figure 1:
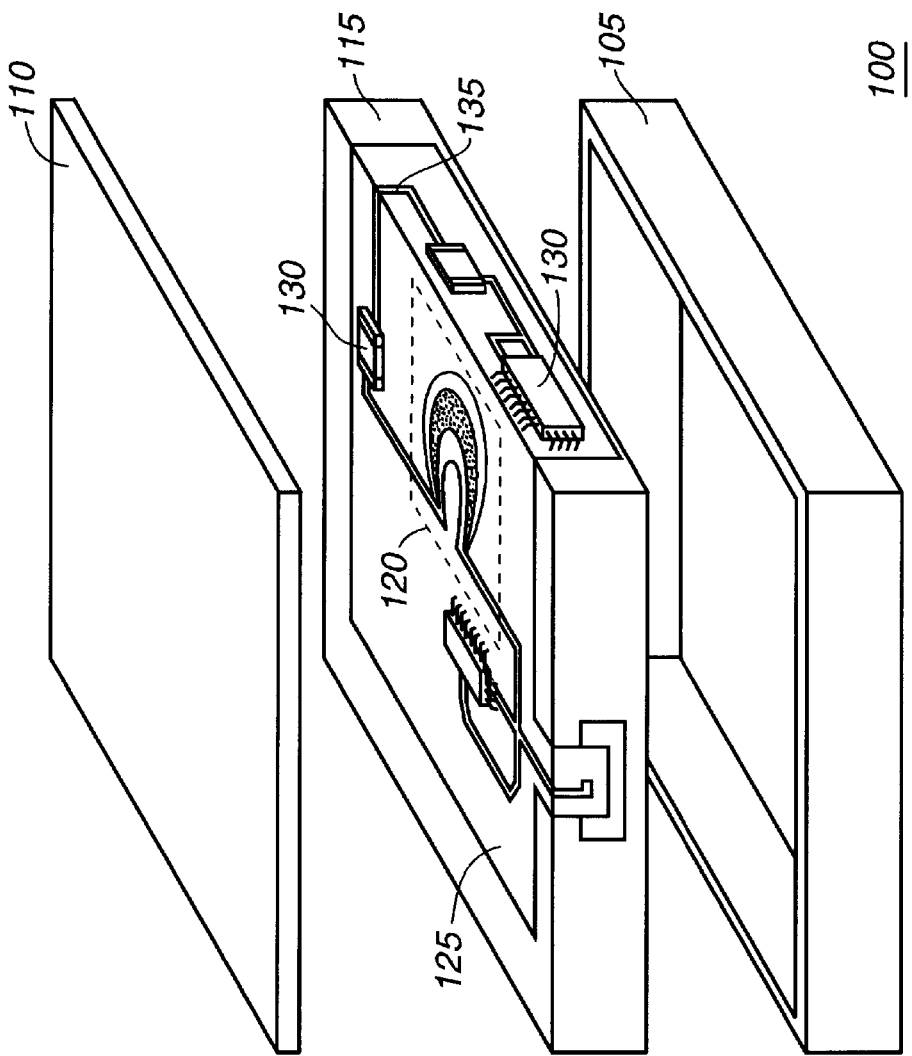
FIG. 1 is an exploded view of an electronic device that includes a tamper proof safety circuit according to the present invention.

While the specification concludes with claims defining the features of the invention that are regarded as novel, it is believed that the invention will be better understood from a consideration of the following description in conjunction with the drawing figures, in which like reference numerals are carried forward.

FIG. 1 is an exploded view of an electronic device 100, such as a primary battery pack or a secondary battery pack, a cellular telephone, or a selective call receiver, that includes a tamper proof safety circuit 120 rendering the device 100 inoperable in the event of unauthorized disassembly. The electronic device 100 includes a housing 105 and a cover 110 which are held together, such as by ultrasonic welding, heat seal processes, adhesive bonding, rivets, or mechanical latches, to enclose electrical circuitry 130 of the electronic device 100. When the device 100 comprises a battery, at least one battery cell 115 is included. The electrical circuitry 130 can be coupled to the cell 115 by a flexible substrate 125 to which the circuitry 130 is mounted in a conventional manner.

According to the present invention, the tamper proof safety circuit 120, which is preferably an integral part of the flexible substrate 125, permits normal operation of the electronic device 100 as long as the cover 110 and the housing 105 remain sealed together. However, upon unauthorized removal of the cover 110 from the housing 105, the tamper proof safety circuit 120 is torn from the flexible substrate 125 to inactivate the electronic device 100. As a result, disassembly of the device 100 conveniently prevents situations in which exposed, potentially unsafe circuitry remains active, thereby minimizing the likelihood of harm to the user in the event of device tampering.

Figure 2:
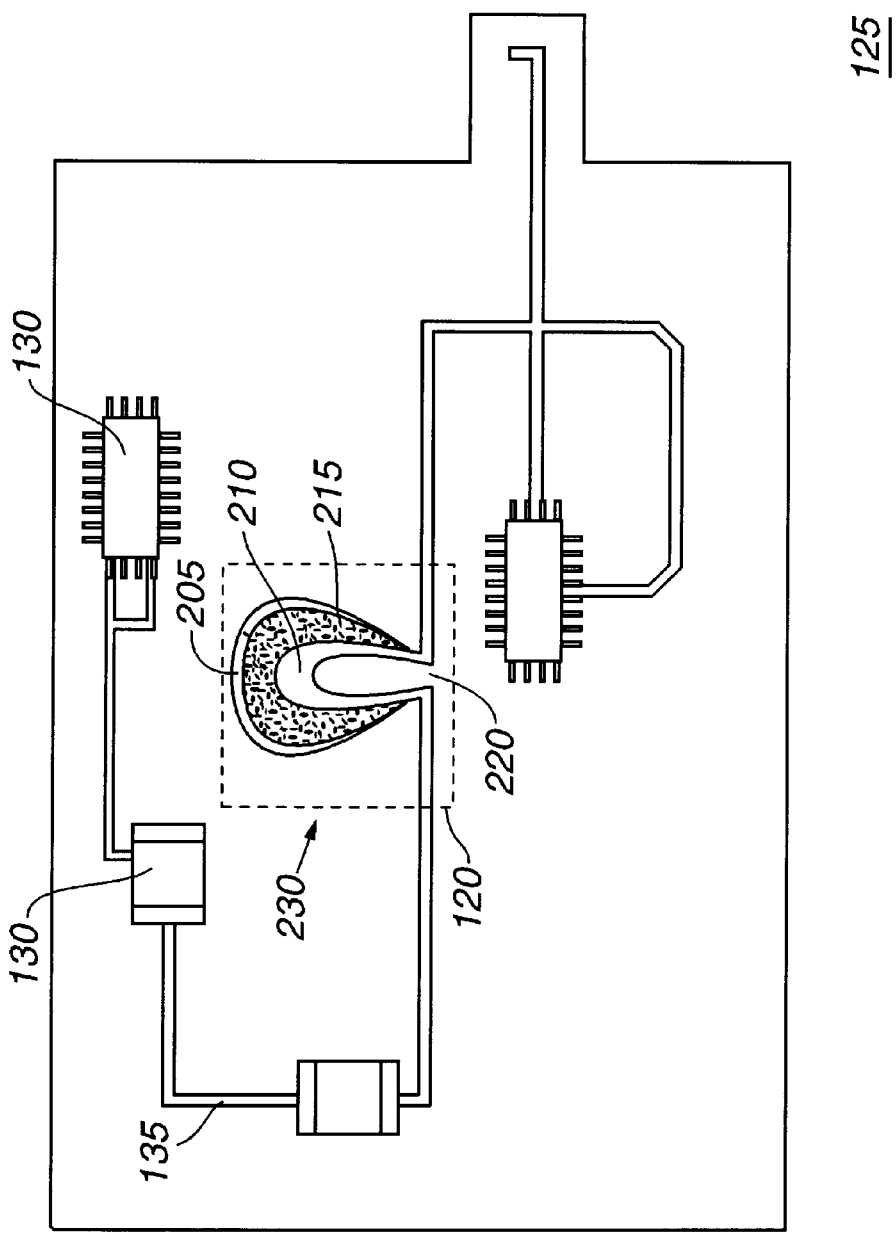
FIG. 2 is a top view of a flexible substrate that incorporates the tamper proof safety circuit of FIG. 1 according to the present invention.

The operation of the tamper proof safety circuit 120 can be better understood by referring to FIG. 2, which is top view of the flexible substrate 125. As shown, the substrate 125 includes metallization 135 which electrically couples the circuitry 130 to the battery cell 115 (FIG. 1) via the safety circuit 120. Preferably, the safety circuit 120 includes a metallized portion 210 that extends into an area of the substrate 125 that is partially surrounded by a cutout 205 in the flexible substrate 125. In other words, portions of the flexible substrate 125 surrounding the metallized portion 210 have been removed to form a moveable flap that is connected to other regions of the substrate 125 at only a single end 220. According to the present invention, the moveable flap adheres to the cover 110 (FIG. 1) when the device 100 is assembled. This could be done, for instance, by coating a top surface of the flap with an adhesive 215 that sticks to the cover 100, by riveting the flap to the cover 100, or by providing a mechanical clasp (not shown) on the cover 100 to grasp the flap once the device 100 is assembled.

Figure 3:
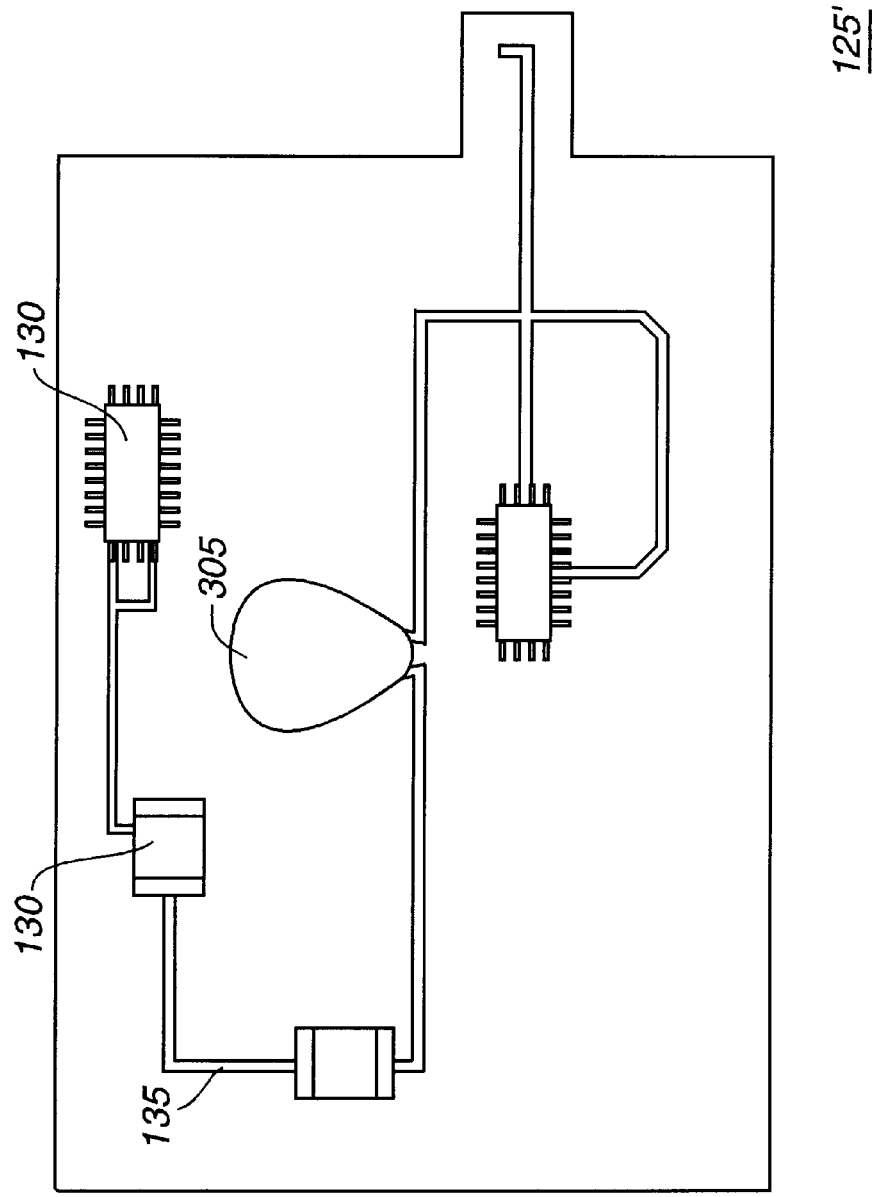
FIG. 3 is a top view of the flexible substrate of FIG. 2 after the electronic device of FIG. 1 has been impermissibly opened.

According to the present invention, unauthorized removal of the cover 110 from the housing 105 will pull up the flap of the flexible substrate 125 and rip the tamper proof safety circuit 120 from the substrate 125, as shown in FIG. 3. Once the tamper proof safety circuit 120 has been torn from the substrate 125 by tampering, the metallized portion 210 (FIG. 2) that previously connected the battery cell 115 (FIG. 1) to the electrical circuitry 130 will no longer be present to provide the electrical connection, leaving a hole 305 torn in the flexible substrate 125. As a result, tampering advantageously renders the electronic device 100 inoperable, preventing situations in which the user could be harmed by exposed, active circuitry.

Preferably, the electronic device 100 is able to be opened by an authorized repairperson without tearing the tamper proof safety circuit 1210 from the flexible substrate 125. By way of example, returning to FIG. 2, the device 100 could be opened by removing the cover 110 in the direction indicated by the arrow 230 and disengaging the flap from the cover 110. In the case where adhesive 215 is used to hold the flap to the cover 110, this could be done by inserting a device (not shown) to hold the flap down while the cover 110 is peeled from the adhesive coated flap. When other coupling devices are used, other methods, such as removal of a rivet, could be used to disengage the flap from the cover 110.

For disposable electronic devices 100 that are not intended to be repaired, a repair method may not be necessary. In this situation, cutouts could be formed in the flexible substrate 125 on both sides of the attached region 220 of the tamper proof safety circuit 120 so that removal of the cover 110 in the direction 230 also causes the tamper proof safety circuit 120 to be lifted away and torn from the substrate 125.

In summary, the electronic device described above includes a tamper proof safety circuit integrally formed into a flexible substrate of the device. The tamper proof safety circuit is formed by surrounding certain metallized portions of the electronic circuitry with cutouts in the flexible substrate to form a flap. The flap is attached to the cover of the electronic device when assembled so that, when the cover is impermissibly removed, the flap is lifted away from the flexible substrate to tear the tamper proof safety circuit from the device, rendering the device inoperable. The likelihood of harm to the user from electrically active, exposed circuitry is therefore minimized.

It will be appreciated by now that there has been provided an improved tamper proof safety circuit for electronic devices.

What is claimed is:

1. A battery pack comprising:

electrical circuitry;

a housing in which the electrical circuitry is situated;

a cover for enclosing the electrical circuitry within the housing;

means for attaching the electrical circuitry to the cover;

a flexible substrate on which the electrical circuitry is mounted;

a battery cell coupled to electrical circuitry by a flexible substrate;

wherein a cutout in the flexible substrate partially surrounds a portion of the electrical circuitry;

whereby disassembly of the cover from the housing can cause tearing of the cutout, which opens the electrical circuitry, rendering the battery pack inoperable.

2. The battery pack of claim 1, wherein the flexible substrate includes a metallized portion in which the cutout is located.

3. The battery pack device of claim 1, wherein the attaching means comprises an adhesive.

4. An electronic device comprising a battery pack having:

electrical circuitry;

a housing in which the electrical circuitry is situated;

a cover for enclosing the electrical circuitry within the housing;

means for attaching the electrical circuitry to the cover;

a flexible substrate on which the electrical circuitry is mounted;

a cell upon which is attached the flexible substrate;

wherein a cutout in the flexible substrate partially surrounds a portion of the electrical circuitry;

whereby disassembly of the cover from the housing can cause tearing of the cutout, which opens the electrical circuitry, rendering the battery pack inoperable.

* * * * *